Oct. 16, 1934.  H. H. KOLLER ET AL  1,976,884

ROLLER SHADE

Filed March 12, 1934   5 Sheets-Sheet 1

Inventors
H. H. Koller
W. G. Dery

By Clarence A. O'Brien
Attorney

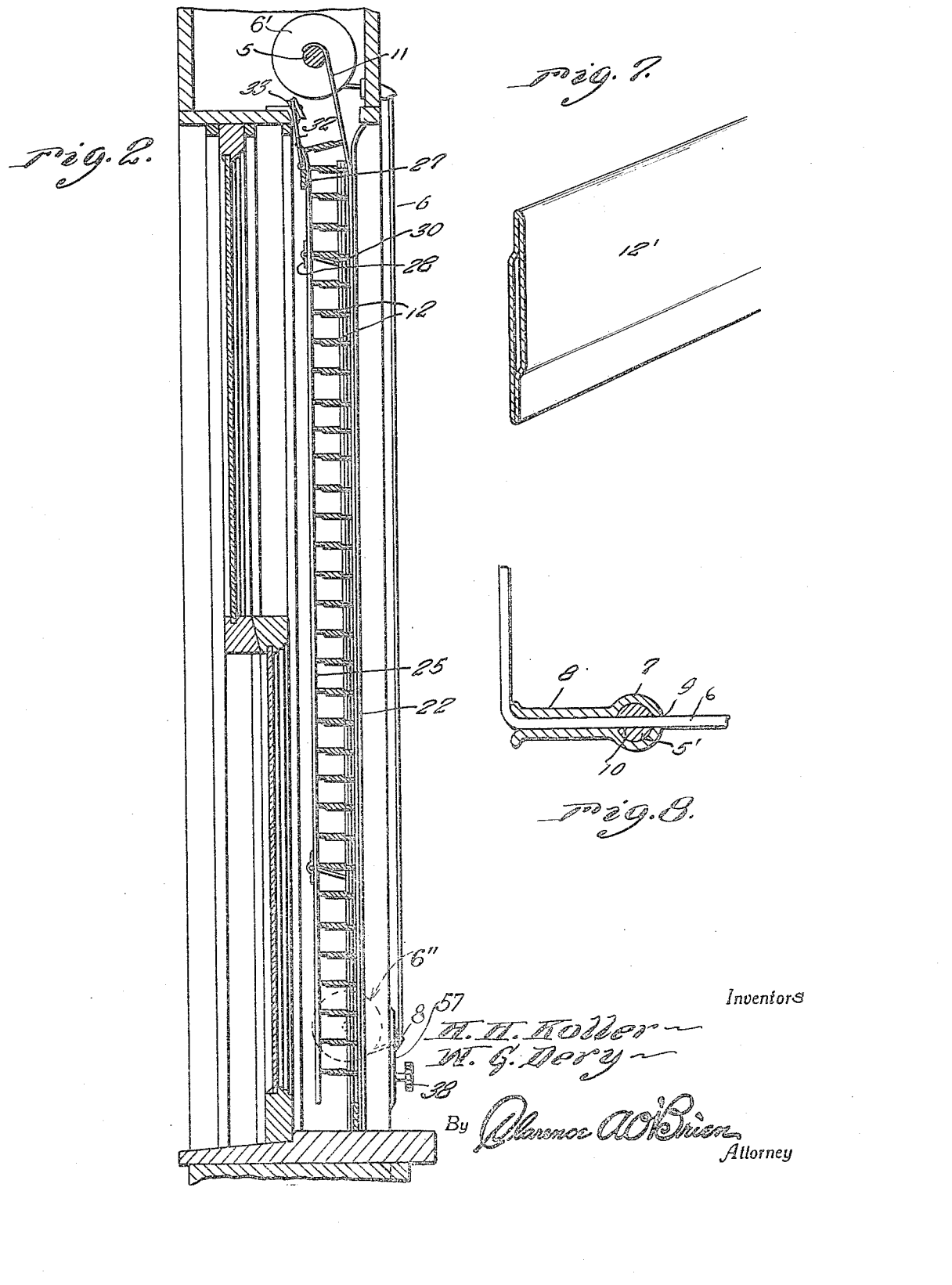

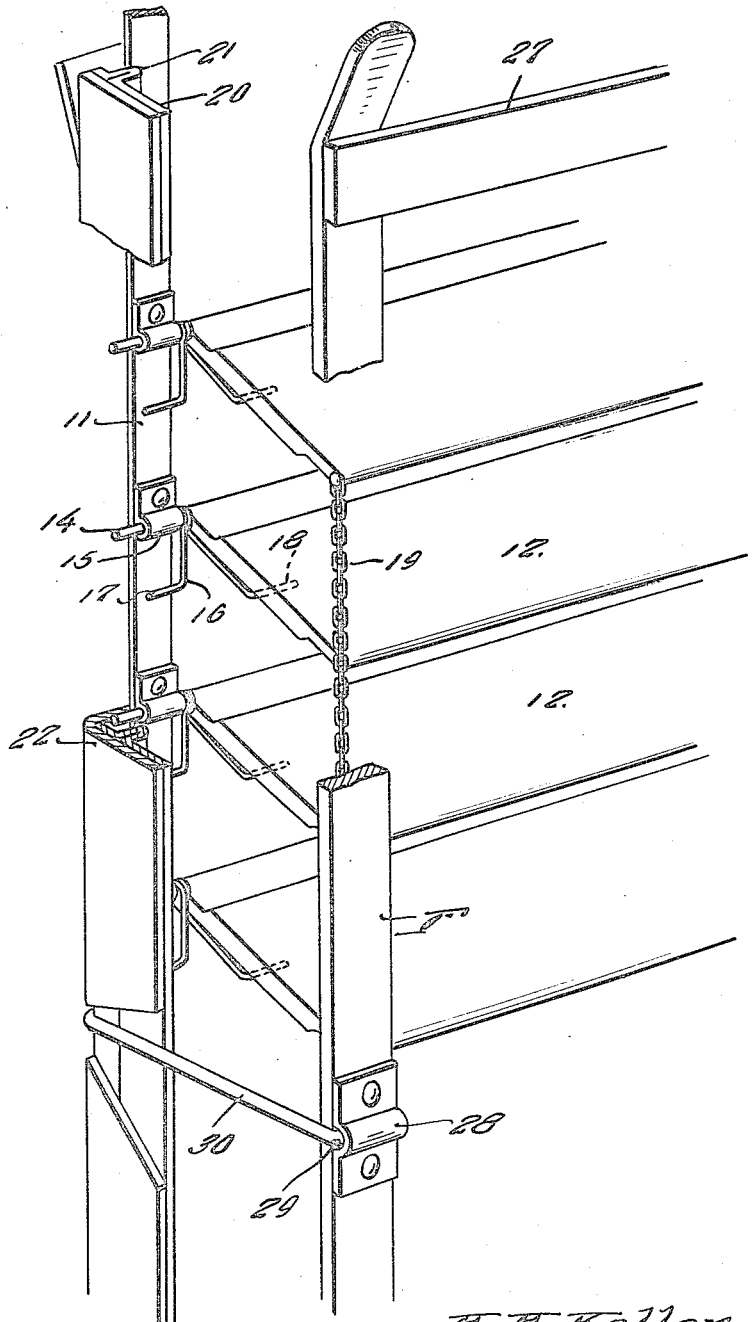

Oct. 16, 1934.  H. H. KOLLER ET AL  1,976,884
ROLLER SHADE
Filed March 12, 1934   5 Sheets-Sheet 5
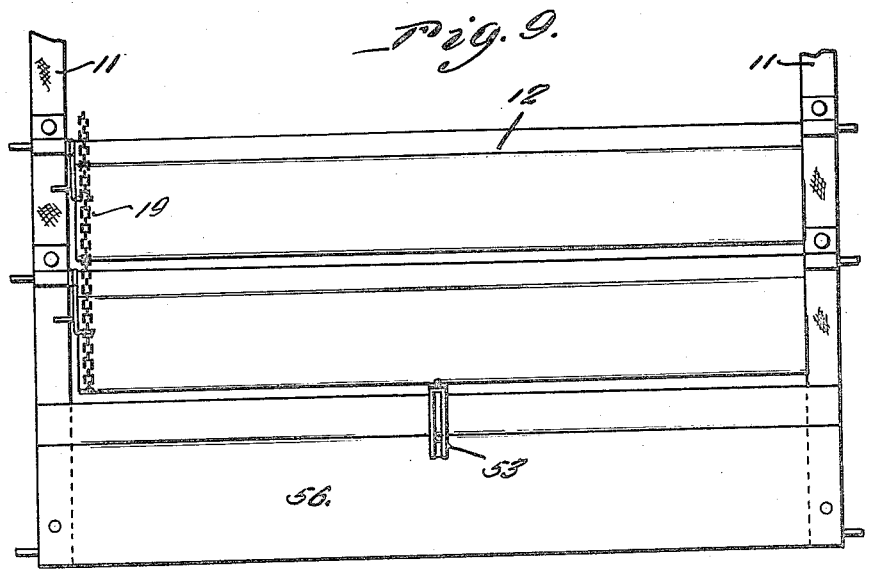
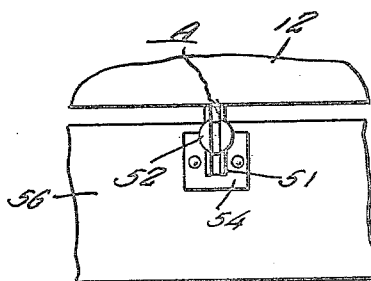
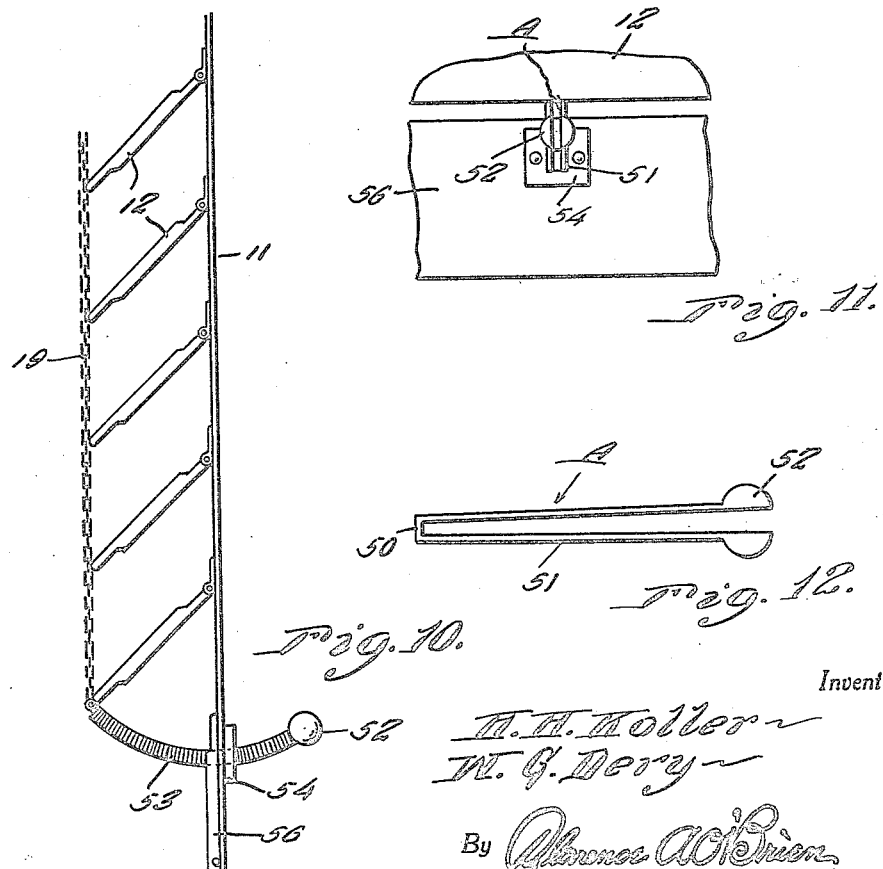
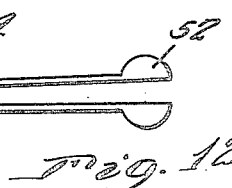

Patented Oct. 16, 1934

1,976,884

UNITED STATES PATENT OFFICE 1,976,884

ROLLER SHADE

Herman H. Koller and Wilfred G. Dery, Amsterdam, N. Y.

Application March 12, 1934, Serial No. 715,214

5 Claims. (Cl. 156—17)

The present invention relates to roller shades, and has more particular reference to the type of roller shade such as is shown in the Koller Patent No. 1,917,449 issued July 11, 1933 and one of the important objects of the invention is to improve on the means used for adjusting the slats.

A further important object of the invention resides in the provision of a comparatively simple structure, easy to operate, thoroughly efficient and reliable in use and operation, and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:

Figure 2 is a vertical section therethrough.

Figure 3 is a fragmentary perspective view showing one of the straps, a plurality of the slats and a portion of the closing frame for the slats.

Figure 7 is a fragmentary perspective view showing a modified form of the slats.

Figure 8 is a sectional view through the cam.

Figure 9 is a fragmentary elevation of another embodiment of the invention.

Figure 10 is a side elevation thereof.

Figure 11 is a detail view showing one end of the operating member, and

Figure 12 is a top plan view of said member.

Figure 6:
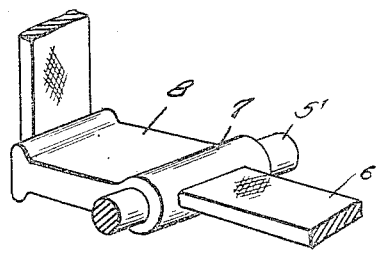
Figure 6 is a perspective view of a cam element.
Figure 4:
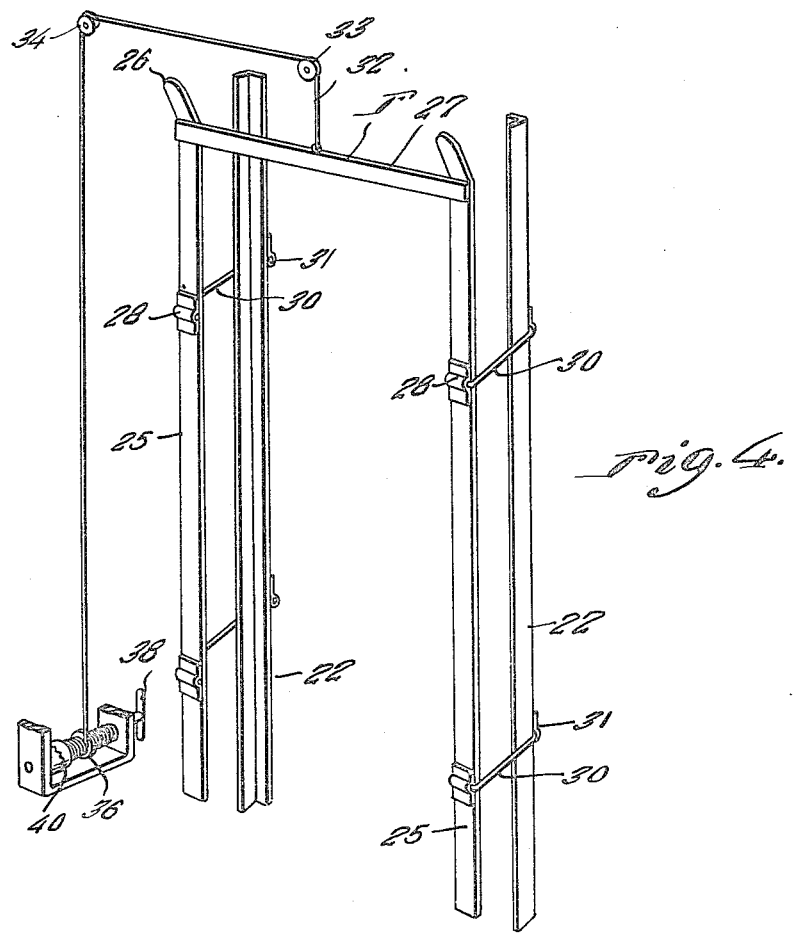
Figure 4 is a diagrammatic view to illustrate the operation of the frame for adjusting the slats.
Figure 5:
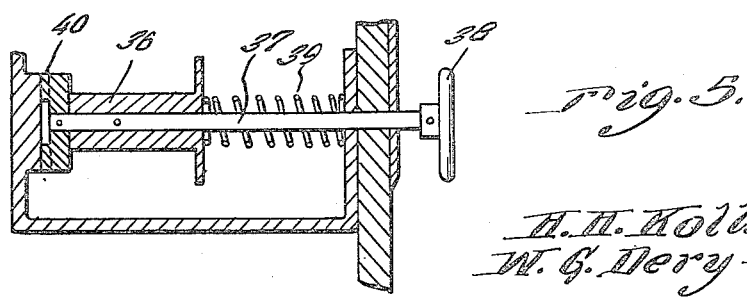
Figure 5 is a detail section through the operating mechanism for the cable which controls said frame.

Referring to the drawings in detail it will be seen that the numeral 5 denotes the shaft journalled for rotation across the top of the window frame and operated by a strap 6 having its upper end attached to a pulley 6' and its lower end to a spring actuated drum 6'' in substantially the same manner as in the Koller patent referred to above. The improvement which we have made here resides in the provision of a cam illustrated in detail in Figures 6 and 8. This cam comprises a sleeve 7 mounted on a stationary shaft 5' and from which projects a flat like hollow arm 8 the interior of which is in communication with the interior of the sleeve 7 and the sleeve 7 has a slot 9 opposite the interior of the arm 8 and the shaft 5' is provided with a slot 10 registering with the interior of the arm and the slot 9. The shaft 5' is suitably supported in the window adjacent the drum 6'', with the free end of the arm 8 projecting from the face plate 57 and the strap 6 passes through the hollow arm, through the slot 10 and the slot 9 in the sleeve, with the strap passing to the drum 6'. Thus it will be seen that when the vertical part of the strap is under tension, the cam device holds the strap against movement, but by pulling upon this vertical part of the strap to slack the same, the strap can be wound upon the drum 6'' or pulled therefrom, as desired.

A pair of straps 11 are attached at their upper ends to the shaft 5 to wind thereon. On these straps 11 are a plurality of slats 12. Each slat has a pair of trunnions 14 one at each end thereof journalled in bearings 15 fixed to the straps 11. Springs tend to normally hold the slats in open position. Each spring is formed from a single strand of resilient material as disclosed to advantage in Figure 3 and indicated by the numerals 16. These strands are partially coiled at their intermediate portions about the trunnions and have at their ends lateral fingers 17 and 18 the former of which abuts the straps and the latter of which abuts the slats. The free corners of the slats are connected to chains 19 so as to operate in unison.

Guide members 20 are provided with longitudinally disposed intermediate inwardly bent flanges 21 to cooperate with angle irons 22 in forming a groove or guideway for the straps 11.

Figure 1:
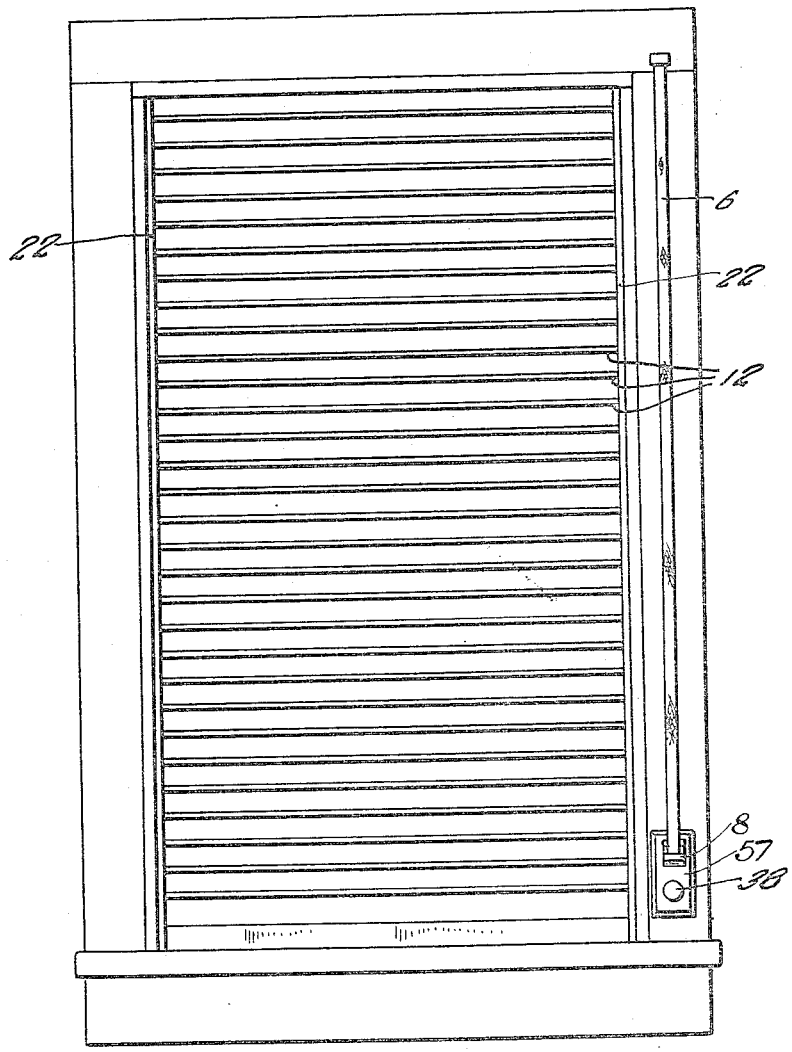
Figure 1 is an inside elevation of a window showing our shade in place.

The letter F denotes generally a frame for adjusting the slats 12. The frame comprises a pair of vertical bars 25 the upper ends of which are inclined upwardly and inwardly as indicated at 26 and a cross bar 27 is connected to the upper portions of the bars 25 below the ends 26. A plurality of bearings 28 are provided on the bars in which ends 29 of links 30 are rockable. The other ends of these links 30 are rockable in bearings 31 on the guides. A cable 32 is connected with the bar 27 and is trained over suitable pulleys 33 and 34 in the upper portion of the window frame and then the cable is windable on a drum 36 operated by a shaft 37 having a knob 38 conveniently located as shown in Figure 1. Spring 39 cooperates with the drum and holds the clutch mechanism 40 in a position to normally prevent operation of the drum 36. However the knob 38 may be easily pulled out and the shaft manually rotated to wind up a portion of the cable 32 on the drum 36 to allow the springs 16 to open the slats 17. When the shaft 37 is rotated so as to allow the cable to unwind therefrom the frame F swings and gravitates downwardly and is sufficiently heavy to overcome the tension of the springs 16 thereby closing the slats 12.

In Figures 9, 10, 11 and 12 we have shown another embodiment of the invention whereby the chains 19 are connected to the slats in the usual way so that they will operate in unison. A U-shaped operating member A is curved longitudinally and includes a cross portion 50 attached to the free edge of the lowermost slat and a pair of curved arms 51 terminating in knobs 52. The outer surfaces of the arms 51 are knurled as at 53 to engage the edges of a keeper plate 54 through an opening of which this member is slidable. This keeper plate 54 is mounted on a cross member 56 connected to the bottom ends of the straps 11. Obviously, referring particularly to Figure 10, by pushing the member A to the left the shutters will be swung upwardly to open position whereas by swinging the member A to the right the shutters will be moved to closed position. It will be understood that the side legs 51 are tensioned in such a manner as to frictionally engage the edges of the opening in the keeper plate 54.

In Figure 7 we have shown an embodiment of the slat 12' which is hollow and may be made of sheet metal.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described our invention, what we claim as new is:

1. In a shade structure of the class described, a pair of straps, a plurality of slats hingedly mounted on the straps, chains connecting the free edges of the slats so that they will swing in unison, springs cooperating with the slats to normally hold them open, and a frame, means for shiftably mounting the frame so that it may be moved in engagement with the free edges of the slats to swing them to closed position.

2. In a shade structure of the class described, a pair of straps, a plurality of slats hingedly mounted on the straps, chains connecting the free edges of the slats so that they will swing in unison, springs cooperating with the slats to normally hold them open, and a frame, means for shiftably mounting the frame so that it may be moved in engagement with the free edges of the slats and swing them to closed position, said frame comprising a pair of bars for engaging said free edges of the slats, means for swingably mounting the frame, and means for moving the frame.

3. In a shade structure of the class described, a pair of straps, slats hingedly mounted on the straps, chains connecting the free edges of the slats to cause them to swing in unison, and an operating member of substantially U-shaped formation to comprise a cross portion connected to the lowermost slat, a keeper plate through which the member is slidable, said member also including a pair of legs curved and extending through the keeper plate and having knurled outer surfaces engageable with the opening with the keeper plate.

4. In a shade structure including a shaft, a shade member attached thereto, a pulley on the shaft, a strap having one end connected with the pulley, a drum to which the other end of the strap is connected, a slotted stationary shaft located in front of the drum, a sleeve through which the slotted shaft passes and the slots therein registering with the slot in the shaft and a hollow arm extending outwardly from the sleeve with the hollow thereof in register with the slots, the strap passing through the arm and the slots in the shaft and sleeve to the drum.

5. In a shade structure of the class described, a shaft, straps each having one end connected with the shaft, slats hingedly connected with the straps, spring means for normally holding the slats in normally open position, flexible members connecting the free edges of the slats together, means for rotating the shaft to wind the straps and the slats thereon, and manually operated means for moving the slats to closed position.

HERMAN H. KOLLER.
WILFRED G. DERY.